(12) United States Patent
Bueb

(10) Patent No.: US 11,875,039 B2
(45) Date of Patent: Jan. 16, 2024

(54) TEMPERATURE-BASED SCRAMBLING FOR ERROR CONTROL IN MEMORY SYSTEMS

(71) Applicant: Micron Technology, Inc., Boise, ID (US)

(72) Inventor: Christopher Joseph Bueb, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 17/456,980

(22) Filed: Nov. 30, 2021

(65) Prior Publication Data

US 2023/0168813 A1 Jun. 1, 2023

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01); *G06F 2211/007* (2013.01)

(58) Field of Classification Search
None
See application file for complete search history.

(56) References Cited

U.S. PATENT DOCUMENTS

| | | | | |
|---|---|---|---|---|
| 2009/0204824 A1* | 8/2009 | Lin | ..................... | G11C 16/3418 714/E11.041 |
| 2014/0115234 A1* | 4/2014 | Woo | ..................... | G06F 12/0246 711/E12.008 |
| 2014/0310527 A1* | 10/2014 | Veugen | ................. | H04L 9/0825 713/150 |
| 2021/0109577 A1* | 4/2021 | Mandava | ............ | G06F 13/1668 |

* cited by examiner

*Primary Examiner* — Michael Krofcheck
*Assistant Examiner* — Janice M. Girouard
(74) *Attorney, Agent, or Firm* — Holland & Hart LLP

(57) ABSTRACT

Methods, systems, and devices for temperature-based scrambling for error control in memory systems are described. Techniques are described for a memory system to scramble data using different scrambling code parameters when writing the data at different temperatures. Scrambling the data using scrambling code parameters that are based on the temperatures at the time or writing the data may reduce errors introduced into the data by operating the memory cells at extreme temperatures.

24 Claims, 5 Drawing Sheets

TEMPERATURE-BASED SCRAMBLING FOR ERROR CONTROL IN MEMORY SYSTEMS

FIELD OF TECHNOLOGY

The following relates generally to one or more systems for memory and more specifically to temperature-based scrambling for error control in memory systems.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Memory systems may be configured to operate within certain (e.g., nominal) temperature ranges. Some memory systems, however, may be used in environments outside of those nominal temperature ranges. For example, when a memory system is incorporated into a vehicle, the temperature of a memory system may cover a large range. For example, during winter, the temperature may drop below a nominal range, and during summer, the temperature may rise above the nominal range. Performing access operations (e.g., a read operation or a write operation) at extreme temperatures may affect the operations and may result in a higher error rate in the stored data. For example, some NAND level states may be more error prone when programmed at temperatures that are outside of a nominal temperature range associate with the memory system.

Some memory systems scramble data before storing it in memory so that when the scrambled data is stored in the memory, the scrambled data may be somewhat equally spread among the different levels of the memory cells. However, the scrambled data may also be prone to a higher rate at extreme temperatures.

Techniques are described for a memory system to scramble data using different scrambling code parameters when writing information based on the temperatures at the time of writing the data. The scrambling code may be configured to reduce a probability of errors when the memory system is operating in a range of temperatures associated with the scrambling code. This may reduce the quantity of errors in the information when the information is subsequently read. In some examples, the scrambling code parameters may reduce the storing of scrambled data in problematic levels of the memory cells at extreme temperatures.

Figure 1:
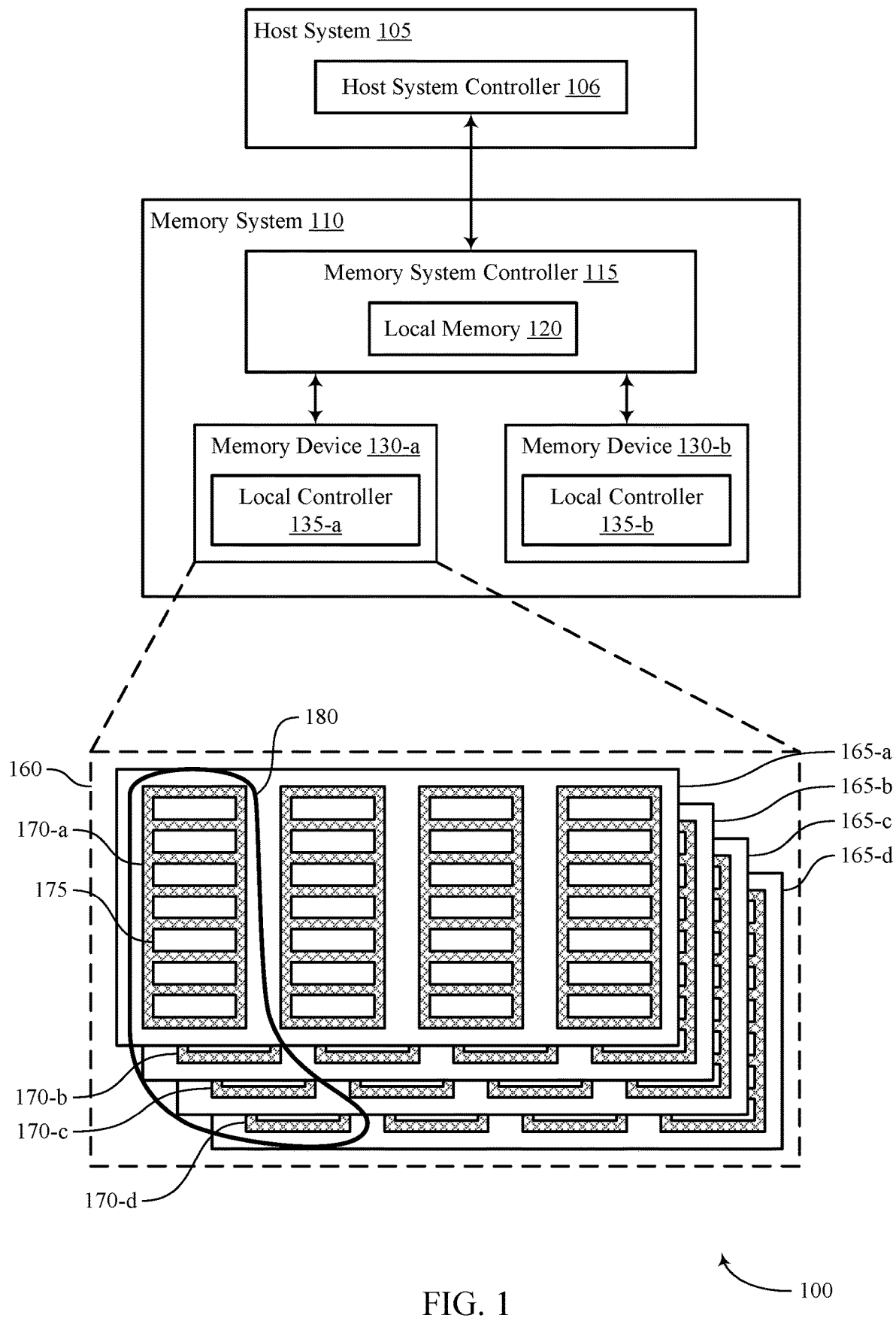
FIG. 1 illustrates an example of a system that supports temperature-based scrambling for error control in memory systems in accordance with examples as disclosed herein.

Features of the disclosure are initially described in the context of a system with reference to FIG. 1. Features of the disclosure are further described in the context of a system and processing of write and read commands using the system with reference to FIGS. 2-3. These and other features of the disclosure are further illustrated by and described in the context of an apparatus diagram and a flowchart that relate to temperature-based scrambling for error control in memory systems with reference to FIGS. 4-5.

FIG. 1 illustrates an example of a system 100 that supports temperature-based scrambling for error control in memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support temperature-based scrambling for error control in memory systems. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Data may be scrambled before storing the data e.g., to attempt to store both 1's and 0's in the memory cells with equal probability. Data scrambling (also referred to as "data randomization") may be carried out, for example, by performing a bit-wise Exclusive Or (XOR) between the data and a pseudo-random scrambling sequence. When stored, the scrambled data may be somewhat equally spread among the different levels of the memory cells. For example, in an SLC device, the scrambled data may be equally spread between the high and low levels corresponding to the "0" and "1" logic states. In an MLC device, the scrambled data may be equally spread between the various levels of the MLC device (e.g., 8 levels for a TLC device, 16 levels for a QLC device, etc.) corresponding to the different logic states. Storage of scrambled data has a number of advantages, including the balancing of data-dependent cell wearing across the memory.

At temperatures that are outside of a nominal temperature range for operating a memory system (whether high temperatures or low temperatures), errors may occur in one or more levels of the memory cells more than in other levels. So when scrambled data is written to the memory at extreme temperatures, more errors may arise in the portion of the scrambled data stored in the problematic levels than in the other levels.

To mitigate against this higher likelihood of errors, scrambling code parameters may be configured to reduce the storing of scrambled data in the problematic levels at extreme temperatures. That is, at extreme temperatures, the scrambling parameters may scramble the data so that the scrambled data is stored in the problematic levels less than in the other layers. This may reduce the number of errors at the extreme temperatures, which may reduce the raw bit error rate (RBER) in devices used in wide operating temperature ranges. This may also enable a higher probability of correcting bit errors using error correction, e.g., using an ECC in a codeword.

Figure 2:
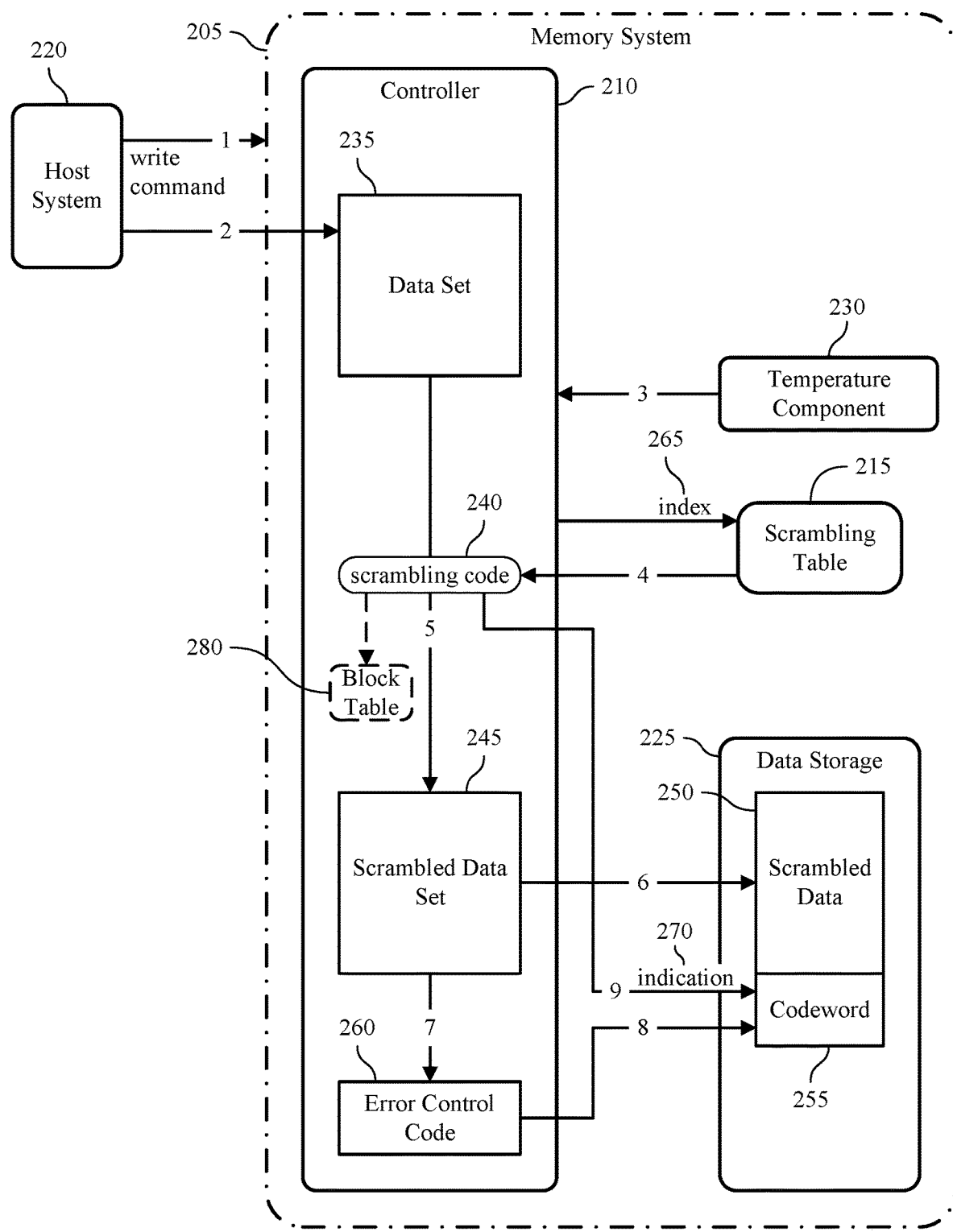
FIG. 2 illustrates an example of a system and depicts an example of processing a write command that support temperature-based scrambling for error control in memory systems in accordance with examples as disclosed herein.

FIG. 2 illustrates an example of a system 200 and depicts an example of processing a write command that supports temperature-based scrambling for error control in memory systems in accordance with examples as disclosed herein. The system 200 may be an example of a system 100 as described with reference to FIG. 1 or aspects thereof. The system 200 may include a memory system 205 configured to store data received from a host system 220 and to send data to the host system 220 if requested by the host system 220 using access commands (e.g., read commands or write commands). The system 200 may implement aspects of the system 100 as described with reference to FIG. 1. For example, the memory system 205 and the host system 220 may be examples of the memory system 110 and the host system 105, respectively.

The memory system 205 may include a data storage 225 to store data transferred between the memory system 205 and the host system 220 (e.g., in response to receiving access commands from the host system 220) as described herein. The data storage 225 may include one or more types of memory as described with reference to FIG. 1. For example, the memory devices may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM. Data storage 225 may be located on a single memory device or may be distributed among more than one memory device.

The memory system 205 may include one or more temperature components 230 for indicating the temperature of the memory system. Each temperature component 230 may determine at least one temperature of the memory system 205 and output an indication thereof. Each temperature component 230 may be or include a temperature sensor. In some examples, the temperature indication may be a single value, such as what may be output by a thermistor. In some examples, the temperature indication may be a code that may be decoded by a controller. Other temperature indications may also be possible. Each memory device may include one or more respective temperature components 230.

The memory system 205 may include a controller 210 for controlling various aspects of the memory system 205, including the passing of data to and from the data storage 225 (e.g., for storing data, retrieving data, and determining memory locations in which to store data and from which to retrieve data). The controller 210 may communicate with the data storage 225 directly or via a bus (not shown) using a protocol specific to each type of memory. In some cases, controller 210 may implement aspects of a memory system controller 115 and/or a local controller 135 as described with reference to FIG. 1.

The controller 210 may be configured to receive data sets (e.g., in conjunction with write commands), scramble the data sets using temperature-dependent scrambling codes, and store the scrambled data sets to memory system 205 (e.g., to data storage 225), as discussed herein. The controller 210 may also be configured to obtain scrambled data sets from memory system 205 (e.g., in response to read commands), descramble the scrambled data sets using the temperature-dependent scrambling codes that were used to scramble the data, and transmit the descrambled data (e.g., to host system 220), as described herein.

Upon a determination that an access command has been received, the controller 210 may execute the access command. For a write command, this may mean receiving data from the host system 220, scrambling the data, and moving the scrambled data to the data storage 225. For a read command, this may mean obtaining scrambled data from the data storage 225, descrambling the data, and transmitting the descrambled data to the host system 220. An error control operation may also be performed on the data to correct errors in the data.

FIG. 2 further depicts an example of the processing of a write command using system 200. The controller 210 may first receive a write command from host system 220 to store a set of data to memory system 205 (1). A data set 235 associated with the write command may also be received from host system 220 (2). The data set 235 may be included with the write command or may be received subsequent to the write command. As defined herein, a "set of data" or "data set" may be defined as data received from the host system in conjunction with a write command or data sent to the host system in conjunction with a read command. The terms "set of data" and "data set" may be used interchangeably.

Upon receipt of the write command, an indication of the temperature of the memory system may be identified (3). For example, the controller 210 may obtain an indication of the temperature from temperature component 230. If more than one temperature component 230 is available in memory system 205, the controller 210 may obtain the indication from a temperature component 230 closest to where the data set is to be stored.

A temperature-dependent scrambling code for scrambling the data set may then be determined (4). For example, the controller 210 may determine a scrambling code 240 configured for the temperature indicated by the indication received from temperature component 230. In some examples, the scrambling code 240 may be selected from a set of scrambling codes. Each of the set of scrambling codes may be associated with a respective range of temperatures.

In those examples, the controller 210 may determine which range to use based on the temperature indicated by the temperature indication. Any number of scrambling codes and respective ranges of temperatures may be used.

In some examples, a scrambling table 215 may be used to aid in the selection of the scrambling code. Scrambling table 215 may be stored in memory system storage (e.g., data storage 225) or on on-chip memory of the controller 210. Each entry in scrambling table 215 may correspond to one of the scrambling codes, dependent on the temperature. The scrambling code 240 may be selected from the set of scrambling codes stored within scrambling table 215, based on the temperature indicated by the temperature component 230. That is, the controller 210 may determine which position to use within scrambling table 215 based on the indicated temperature and select the scrambling code 240 from that position.

For example, assuming that memory system 205 has a nominal (e.g., desired) use range between a first temperature and a higher second temperature, scrambling table 215 may include a scrambling code corresponding to the nominal range (temperatures between the first and second temperatures). Scrambling table 215 may also have two other scrambling codes respectively corresponding to a low temperature range (e.g., temperatures below the first temperature) and a high temperature range (e.g., temperatures above the second temperature). The scrambling codes respectively corresponding to the low and high temperature ranges may be configured to reduce bit errors when reads are subsequently performed. The controller 210 may select the scrambling code associated with whichever range the temperature indicated by the temperature component 230 fell.

An index 265 may be used to point to the entry in the table that corresponds to the indicated temperature range. The controller may use the index 265 to obtain the desired scrambling code from scrambling table 215. The index may also be used during read operations to obtain the desired scrambling code for descrambling, as discussed with respect to FIG. 3. Any number of temperature ranges and associated scrambling codes may be stored in scrambling table 215 and potentially used for scrambling the data sets.

The set of scrambling codes may be configured to prioritize one or more voltage levels stored in memory cells of the memory system over other voltage levels stored in the memory system. By using different scrambling codes for different temperature ranges, scrambling parameters may be used at different temperature ranges to reduce the storing of scrambled data in levels that may be problematic at each respective temperature range.

Once the scrambling code 240 has been determined (e.g., selected from scrambling table 215), scrambling of the data set may be performed using the scrambling code 240 (5). For example, the controller 210 may apply the scrambling code 240 to the data set 235 to obtain a scrambled data set 245.

The scrambled data set 245 may be stored in the memory system (6). For example, the controller 210 may store the scrambled data set 245 in data storage 225 as scrambled data 250. In some cases, the scrambled data may be stored on the same memory device as the temperature component 230 from which the controller received the indication of the temperature. In some cases, the scrambled set of data may be stored in SLCs of the memory system. In some cases, the scrambled set of data may be stored in MLCs of the memory system.

In some examples, an error control code (ECC) 260 may be generated for the scrambled data set 245 using an error control operation (7). This may help in correcting storage errors or other correctable errors that may arise in the data. For example, the controller 210 may encode the data for storage using a suitable ECC. Any suitable type of ECC, such as, for example, Low Density Parity Check (LDPC), Reed Solomon (RS) or Bose-Chaudhuri-Hocquenghem (BCH), may be used. Other types of ECCs may also be used. An error control operation may include any error detection operation or error correction operation, such as single-error detection, single-error correction, single error correction and double-error detection, or other types of error control operations.

The error control operation may be performed on the data set before or after the data set has been scrambled. In some cases, it may be advantageous to perform the error control operation after the data set has been scrambled. Because the scrambling code is set up to avoid the use of levels that are susceptible to cause errors in the data at extreme temperatures, the scrambled data may be likely to have less errors than the original data. This may result in an easier error correction job for the ECC decoding during a read operation if the ECC decoding occurs before descrambling. If an error control operation is performed on the scrambled data set 245, the scrambled data set may be saved to data storage 225 after the error control operation rather than before it.

After the error control code 260 has been generated, it may be stored in the memory system (8). For example, the controller 210 may store the error control code 260 in a codeword 255. The codeword 255 may include the scrambled data 250 and the error control code 260. The error control code 260 may be scrambled before being stored or may remain unscrambled. The codeword 255 may include an amount of user data and additional bits (e.g., bits supporting the error control operation) carrying various information to provide reliable user data. Because the scrambling codes respectively corresponding to the low and high temperature ranges may be configured to reduce bit errors when reads are subsequently performed, the probability of correcting errors in the codeword may be improved.

To descramble the scrambled data 250 when the data is retrieved (e.g., in conjunction with a subsequent read operation), the same scrambling code that was used to scramble the data may be used. To facilitate this, the controller may store in the memory system an indication 270 of the scrambling code 240 that was used to scramble the data (9). In some examples, the indication 270 may be or include the value of the index 265 used to select the scrambling code 240 from scrambling table 215 (e.g., the index that points to the table entry that includes the selected scrambling code 240). In other examples, the indication 270 may be or include the selected scrambling code 240.

In some examples, the controller 210 may store the indication 270 in the codeword 255 associated with the scrambled data 250. In some cases, a portion of the codeword 255 may be unused, and the indication 270 of the scrambling code 240 (e.g., the index 265 or the value of the scrambling code) may be stored in spare bits of the unused portion of the codeword 255. In some examples, ECC encoding may also be applied to the indication. Storing the indication 270 in the codeword 255 may be preferable when each memory page is scrambled using its own scrambling code. Alternatively, however, scrambling and descrambling may be applied to any other suitable unit of data, such as to blocks or superblocks that may be programmed as a unit. In those cases, the controller may store the indication 270 in a block table 280 having entries associated with each block or superblock. The indication 270 may be stored in the entry of the block table that is associated with the block or superblock in which the scrambled data 250 is stored. The indication 270 may be scrambled before being stored or remain unscrambled.

Although the scrambled data set 245, the scrambling code 240, and the error control code 260 are discussed as being stored at separate times in memory system 205, the scrambled data set 245, the scrambling code 240, and the error control code 260 may be stored in memory system 205 in any order or may be stored at the same time. In addition, instead of the codeword 255 being stored as a separate entity from the scrambled data 250, as depicted, the codeword 255 and the scrambled data 250 may be intermingled so that the scrambled data and the codeword are stored as a single entity.

Figure 3:
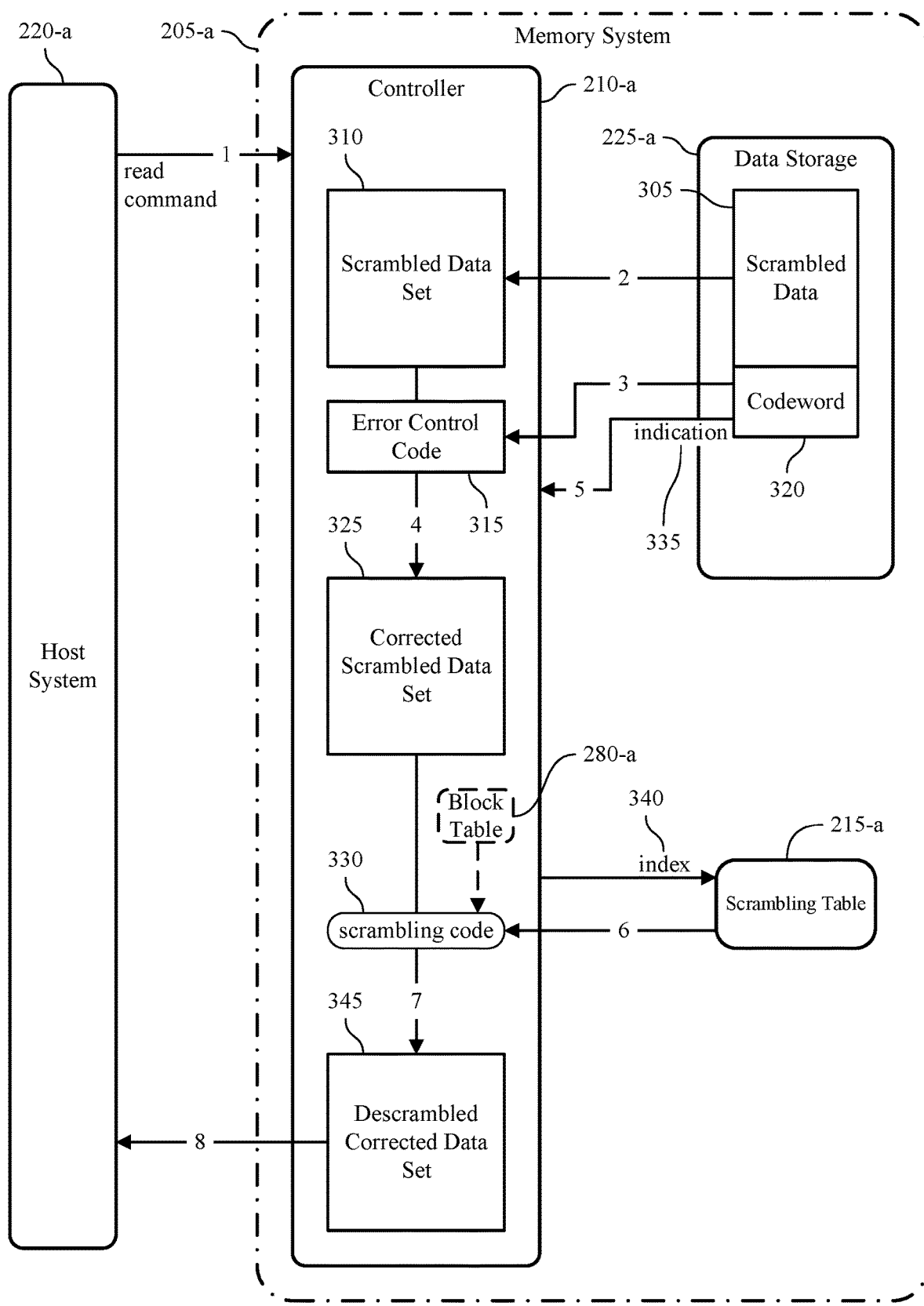
FIG. 3 illustrates an example of a system and depicts an example of processing a read command that supports temperature-based scrambling for error control in memory systems in accordance with examples as disclosed herein.

FIG. 3 is an example of a system 200-a and depicts an example of processing a read command using the system 200-a that supports temperature-based scrambling for error control in memory systems in accordance with examples as disclosed herein. Aspects of the system 200-a are described with reference to FIG. 2. Features of the system 200-a that are named and numbered to features described with reference to the system 200 of FIG. 2 similarly may be embodied similarly.

The controller 210-a may receive a read command from host system 220-a to retrieve a set of data from the memory system 205-a (1). The set of data may have been previously written to the memory system in conjunction with a temperature-dependent scrambling code (e.g., in the manner discussed with respect to FIG. 2).

Upon receipt of the read command, scrambled data 305 corresponding to the requested data may be retrieved from memory system 205-a (2). To do this, the controller 210-a may determine the address within data storage 225-a in which the corresponding scrambled data 305 is stored, and then retrieve the scrambled data as a scrambled data set 310.

If an error control code 315 was generated and saved for the set of data, the error control code 315 may also be retrieved from the memory system 205-a (3). In some examples, the controller 210-a may retrieve the error control code 315 from a codeword 320 associated with the scrambled data 305.

Using the error control code 315, a second error control operation may be performed on the scrambled data set 310 to correct storage or other errors that may have arisen in the data (4). For example, the controller 210-a may decode the scrambled data using the error control code 315, which was used to encode the scrambled data during the write operation. This may result in a corrected scrambled data set 325.

A scrambling code 330 used to scramble the data may be determined to descramble the scrambled data. In some examples, the controller 210-a may retrieve an indication 335 of the scrambling code that was used to scramble the set of data. (5). The indication 335 may be similar to the indication 270. the controller 210-a may retrieve the indication 335 from the codeword 320 associated with the scrambled data 305 or from the block table 280-a. In some examples, the indication 335 may be or include an index 340 that points to the table entry in scrambling table 215-a in which the scrambling code is stored that was used to scramble the original data set, as discussed herein. The controller 210-a may obtain the scrambling code 330 from scrambling table 215-a by using the index 340 (6). In other examples, the indication 335 may be or include the scrambling code that was used to scramble the original data set. In those cases, the controller 210-a may obtain the scrambling code 330 directly from the indication 335.

The corrected scrambled data set 325 may then be descrambled using the scrambling code 330 (7). For example, the controller 210-a may apply the scrambling code 330 to the corrected scrambled data set 325 to obtain a descrambled corrected data set 345. If the original data did not include an error control code, the scrambled data set 310 may be descrambled instead of the corrected scrambled data set 325.

After the data set has been corrected and descrambled, the controller may transmit the descrambled corrected data set 345 to host system 220-a to complete the read command (8).

In one example, the read command may request that the data set 235-a, be read and sent to host system 220-a. In that case, the scrambled data 305 and the codeword 320 may respectively correspond to the scrambled data 250 and the codeword 255, described with reference to FIG. 2, and may be retrieved from the same locations in data storage 225-a in which scrambled data 250 and the codeword 255 were stored. The error control code 315 stored within the codeword 320 may correspond to the error control code 260 stored within the codeword 255. So after the error control code 315 has been applied to the scrambled data set 310 to correct storage errors that have arisen in the data, the corrected scrambled data set 325 may correspond to the scrambled data set 245 described with reference to FIG. 2.

Because the codeword 320 may correspond to the codeword 255, the indication 335 may correspond to the indication 270 and may include the same index 340 as the index 265. As such, the scrambling code 330 obtained from scrambling table 215-a using the index 340 may correspond to the same scrambling code 240 used to scramble the data as described with reference to FIG. 2. Thus, when the corrected scrambled data set 325 is descrambled using the scrambling code 330, the resulting descrambled corrected data set 345 sent to host system 220-a may correspond to the data set 235 received from host system 220-a.

Figure 4:
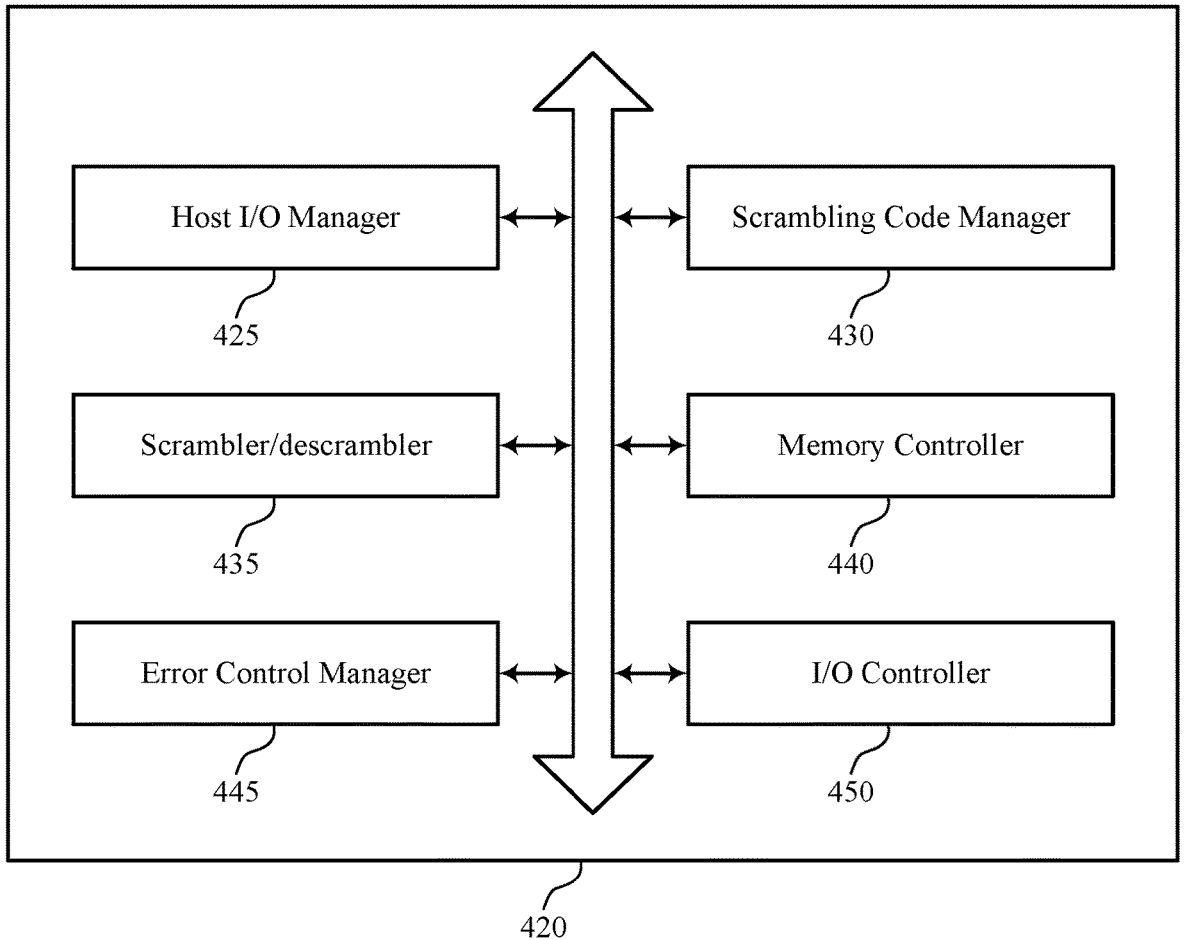
FIG. 4 shows a block diagram of a memory system that supports temperature-based scrambling for error control in memory systems in accordance with examples as disclosed herein.

FIG. 4 shows a block diagram 400 of a memory system 420 that supports temperature-based scrambling for error control in memory systems in accordance with examples as disclosed herein. The memory system 420 may be an example of aspects of a memory device as described with reference to FIGS. 1 through 3. The memory system 420, or various components thereof, may be an example of means for performing various aspects of temperature-based scrambling for error control in memory systems as described herein. For example, the memory system 420 may include a host I/O manager 425, a scrambling code manager 430, a scrambler/descrambler 435, a memory controller 440, an error control manager 445, an I/O controller 450, or any combination thereof. Each of these components may communicate, directly or indirectly, with one another (e.g., via one or more buses).

The host I/O manager 425 may be configured as or otherwise support a means for receiving a command to write a set of data to a memory system. The scrambling code manager 430 may be configured as or otherwise support a means for selecting, based at least in part on receiving the command and a temperature of the memory system, a scrambling code from a set of scrambling codes for scrambling the set of data, each scrambling code of the set of scrambling codes corresponding to a respective temperature range of the memory system. The scrambler/descrambler 435 may be configured as or otherwise support a means for scrambling the set of data using the selected scrambling code. The memory controller 440 may be configured as or otherwise support a means for storing the scrambled set of data in the memory system.

In some examples, the memory controller 440 may be configured as or otherwise support a means for storing, in the memory system, an indication of the selected scrambling code used to scramble the set of data.

In some examples, the indication may include an index of a table that includes the set of scrambling codes, the index pointing to an entry in the table that includes the selected scrambling code. In some examples, the indication may include the selected scrambling code. In some examples, the indication may be stored in a codeword associated with the stored scrambled set of data.

In some examples, the host I/O manager 425 may be configured as or otherwise support a means for receiving a second command to read the set of data from the memory system. In some examples, the memory controller 440 may be configured as or otherwise support a means for retrieving, from the memory system, the scrambled set of data. In some examples, the scrambling code manager 430 may be configured as or otherwise support a means for identifying, based at least in part on receiving the second command, the scrambling code that was used to scramble the set of data. In some examples, the scrambler/descrambler 435 may be configured as or otherwise support a means for descrambling the scrambled set of data using the identified scrambling code. In some examples, the host I/O manager 425 may be configured as or otherwise support a means for transmitting the descrambled set of data to a host system.

In some examples, the memory controller 440 may be configured as or otherwise support a means for retrieving, from the memory system, an indication of the scrambling code that was used to scramble the set of data, based at least in part on receiving the second command, where identifying the scrambling code is based at least in part on retrieving the indication.

In some examples, the error control manager 445 may be configured as or otherwise support a means for generating, using an error control operation, an error control code for the scrambled set of data after the set of data has been scrambled. In some examples, the memory controller 440 may be configured as or otherwise support a means for storing the error control code in the memory system.

In some examples, the scrambler/descrambler 435 may be configured as or otherwise support a means for scrambling the generated error control code before storing the scrambled error control code in the memory system.

In some examples, the host I/O manager 425 may be configured as or otherwise support a means for receiving a second command to read the set of data from the memory system. In some examples, the memory controller 440 may be configured as or otherwise support a means for retrieving, from the memory system, the scrambled set of data and the error control code for the scrambled set of data. In some examples, the error control manager 445 may be configured as or otherwise support a means for performing a second error control operation on the scrambled set of data using the error control code to obtain a corrected scrambled set of data based at least in part on retrieving the scrambled set of data and the error control code. In some examples, the scrambling code manager 430 may be configured as or otherwise support a means for identifying, based at least in part on receiving the second command, the scrambling code that was used to scramble the set of data. In some examples, the scrambler/descrambler 435 may be configured as or otherwise support a means for descrambling the corrected scrambled set of data using the identified scrambling code. In some examples, the host I/O manager 425 may be configured as or otherwise support a means for transmitting the descrambled corrected set of data to a host system.

In some examples, the set of scrambling codes may each be configured to prioritize one or more voltage levels stored in the memory system over other voltage levels stored in the memory system.

In some examples, the scrambled set of data may be stored in multi-level cells of the memory system.

In some examples, the I/O controller 450 may be configured as or otherwise support a means for identifying, based at least in part on receiving the command, the temperature of the memory system, where selecting the scrambling code is based at least in part on identifying the temperature.

In some examples, the host I/O manager 425 may be configured as or otherwise support a means for receiving a command to write a set of data to a memory system. In some examples, the scrambling code manager 430 may be configured as or otherwise support a means for selecting, basing at least in part on receiving the command and a temperature of the memory system, a scrambling code from a set of scrambling codes for scrambling the set of data, each scrambling code of the set of scrambling codes corresponding to a respective temperature range of the memory system. In some examples, the scrambler/descrambler 435 may be configured as or otherwise support a means for scrambling the set of data using the selected scrambling code. In some examples, the memory controller 440 may be configured as or otherwise support a means for storing the scrambled set of data in the memory system.

In some examples, the host I/O manager 425 may be configured as or otherwise support a means for receiving a second command to read the set of data from the memory system. In some examples, the memory controller 440 may be configured as or otherwise support a means for retrieving, from the memory system, the scrambled set of data. In some examples, the scrambling code manager 430 may be configured as or otherwise support a means for identifying, based at least in part on receiving the second command, the scrambling code that was used to scramble the set of data. In some examples, the scrambler/descrambler 435 may be configured as or otherwise support a means for descrambling the scrambled set of data using the identified scrambling code. In some examples, the host I/O manager 425 may be configured as or otherwise support a means for transmitting the descrambled set of data to a host system.

In some examples, the memory controller 440 may be configured as or otherwise support a means for retrieving, from the memory system, an indication of the scrambling code that was used to scramble the set of data, based at least in part on receiving the second command, where identifying the scrambling code is based at least in part on retrieving the indication.

In some examples, the error control manager 445 may be configured as or otherwise support a means for generating, using an error control operation, an error control code for the scrambled set of data after the set of data has been scrambled. In some examples, the memory controller 440 may be configured as or otherwise support a means for storing the error control code in the memory system.

In some examples, the scrambler/descrambler 435 may be configured as or otherwise support a means for scrambling the generated error control code before storing the scrambled error control code in the memory system.

Figure 5:
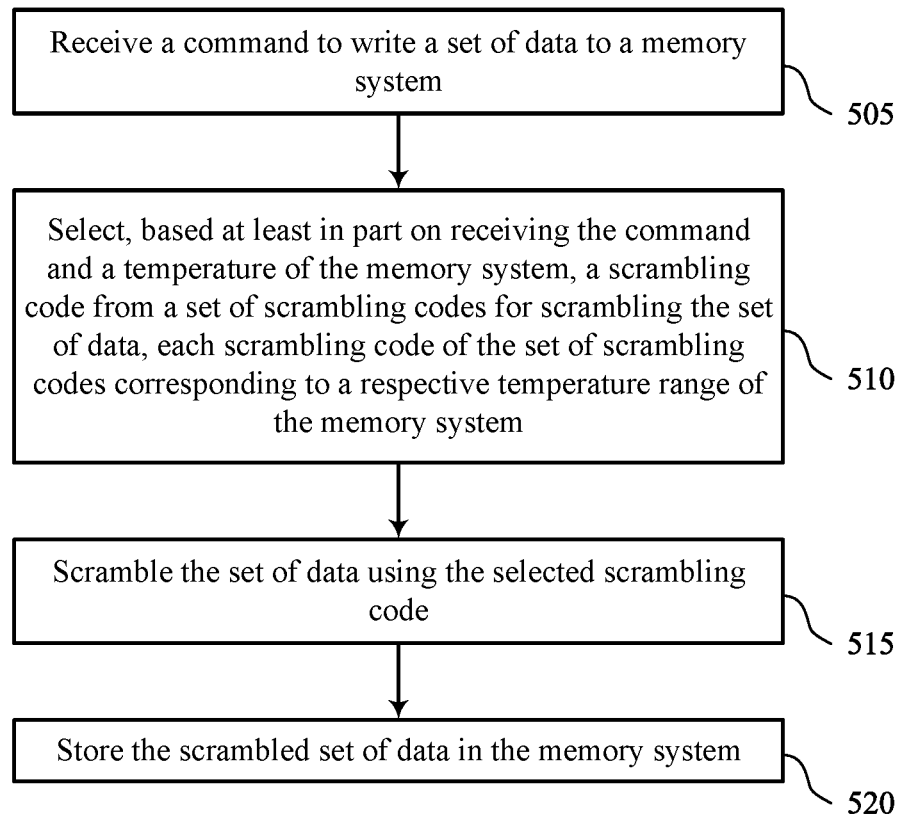
FIG. 5 shows a flowchart illustrating a method or methods that support temperature-based scrambling for error control in memory systems in accordance with examples as disclosed herein.

FIG. 5 shows a flowchart illustrating a method 500 that supports temperature-based scrambling for error control in memory systems in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include receiving a command to write a set of data to a memory system. The operations of 505 may be performed in accordance with examples as disclosed herein. In some examples, aspects of the operations of 505 may be performed by a host I/O manager 425 as described with reference to FIG. 4.

At 510, the method may include selecting, based at least in part on receiving the command and a temperature of the memory system, a scrambling code from a set of scrambling codes for scrambling the set of data, each scrambling code of the set of scrambling codes corresponding to a respective temperature range of the memory system. The operations of 510 may be performed in accordance with examples as disclosed herein. In some examples, aspects of the operations of 510 may be performed by a scrambling code manager 430 as described with reference to FIG. 4.

At 515, the method may include scrambling the set of data using the selected scrambling code. The operations of 515 may be performed in accordance with examples as disclosed herein. In some examples, aspects of the operations of 515 may be performed by a scrambler/descrambler 435 as described with reference to FIG. 4.

At 520, the method may include storing the scrambled set of data in the memory system. The operations of 520 may be performed in accordance with examples as disclosed herein. In some examples, aspects of the operations of 520 may be performed by a memory controller 440 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor), or any combination thereof for performing the following aspects of the present disclosure:

Aspect 1: The method or apparatus, including operations, features, circuitry, logic, means, or instructions, or any combination thereof for receiving a command to write a set of data to a memory system; selecting, based at least in part on receiving the command and a temperature of the memory system, a scrambling code from a set of scrambling codes for scrambling the set of data, each scrambling code of the set of scrambling codes corresponding to a respective temperature range of the memory system; scrambling the set of data using the selected scrambling code; and storing the scrambled set of data in the memory system.

Aspect 2: The method or apparatus of aspect 1, further including operations, features, circuitry, logic, means, or instructions, or any combination thereof for storing, in the memory system, an indication of the selected scrambling code used to scramble the set of data.

Aspect 3: The method or apparatus of aspect 2, further including operations, features, circuitry, logic, means, or instructions, or any combination thereof for the indication includes an index of a table that includes the set of scrambling codes, the index pointing to an entry in the table that includes the selected scrambling code.

Aspect 4: The method or apparatus of any of aspects 2 through 3, further including operations, features, circuitry, logic, means, or instructions, or any combination thereof for the indication includes the selected scrambling code.

Aspect 5: The method or apparatus of any of aspects 2 through 4, further including operations, features, circuitry, logic, means, or instructions, or any combination thereof for the indication is stored in a codeword associated with the stored scrambled set of data.

Aspect 6: The method or apparatus of any of aspects 1 through 5, further including operations, features, circuitry, logic, means, or instructions, or any combination thereof for receiving a second command to read the set of data from the memory system; retrieving, from the memory system, the scrambled set of data; identifying, based at least in part on receiving the second command, the scrambling code that was used to scramble the set of data; descrambling the scrambled set of data using the identified scrambling code; and transmitting the descrambled set of data to a host system.

Aspect 7: The method or apparatus of aspect 6, further including operations, features, circuitry, logic, means, or instructions, or any combination thereof for retrieving, from the memory system, an indication of the scrambling code that was used to scramble the set of data, based at least in part on receiving the second command, where identifying the scrambling code is based at least in part on retrieving the indication.

Aspect 8: The method or apparatus of any of aspects 1 through 7, further including operations, features, circuitry, logic, means, or instructions, or any combination thereof for generating, using an error control operation, an error control code for the scrambled set of data after the set of data has been scrambled and storing the error control code in the memory system.

Aspect 9: The method or apparatus of aspect 8, further including operations, features, circuitry, logic, means, or instructions, or any combination thereof for scrambling the generated error control code before storing the scrambled error control code in the memory system.

Aspect 10: The method or apparatus of any of aspects 8 through 9, further including operations, features, circuitry, logic, means, or instructions, or any combination thereof for receiving a second command to read the set of data from the memory system; retrieving, from the memory system, the scrambled set of data and the error control code for the scrambled set of data; performing a second error control operation on the scrambled set of data using the error control code to obtain a corrected scrambled set of data based at least in part on retrieving the scrambled set of data and the error control code; identifying, based at least in part on receiving the second command, the scrambling code that was used to scramble the set of data; descrambling the corrected scrambled set of data using the identified scrambling code; and transmitting the descrambled corrected set of data to a host system.

Aspect 11: The method or apparatus of any of aspects 1 through 10, further including operations, features, circuitry, logic, means, or instructions, or any combination thereof for the set of scrambling codes are each configured to prioritize one or more voltage levels stored in the memory system over other voltage levels stored in the memory system.

Aspect 12: The method or apparatus of any of aspects 1 through 11, further including operations, features, circuitry, logic, means, or instructions, or any combination thereof for the scrambled set of data is stored in multi-level cells of the memory system.

Aspect 13: The method or apparatus of any of aspects 1 through 12, further including operations, features, circuitry, logic, means, or instructions, or any combination thereof for identifying, based at least in part on receiving the command, the temperature of the memory system, where selecting the scrambling code is based at least in part on identifying the temperature.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 14: An apparatus, including: a controller associated with a memory system, where the controller is configured to cause the apparatus to: receive a command to write a set of data to the memory system; select, based at least in part on receiving the command and a temperature of the memory system, a scrambling code from a set of scrambling codes for scrambling the set of data, each scrambling code of the set of scrambling codes corresponding to a respective temperature range of the memory system; scramble the set of data using the selected scrambling code; and store the scrambled set of data in the memory system.

Aspect 15: The apparatus of aspect 14, where the controller is further configured to cause the apparatus to: store, in the memory system, an indication of the selected scrambling code used to scramble the set of data.

Aspect 16: The apparatus of any of aspects 14 through 15, where the controller is further configured to cause the apparatus to: receive a second command to read the set of data from the memory system; retrieve, from the memory system, the scrambled set of data; identify, based at least in part on receiving the second command, the scrambling code that was used to scramble the set of data; descramble the scrambled set of data using the identified scrambling code; and transmit the descrambled set of data to a host system.

Aspect 17: The apparatus of aspect 16, where the controller is further configured to cause the apparatus to: retrieve, from the memory system, an indication of the scrambling code that was used to scramble the set of data, based at least in part on receiving the second command, where identifying the scrambling code is based at least in part on retrieving the indication.

Aspect 18: The apparatus of any of aspects 14 through 17, where the controller is further configured to cause the apparatus to: generate, using an error control operation, an error control code for the scrambled set of data after the set of data has been scrambled; and store the error control code in the memory system.

Aspect 19: The apparatus of aspect 18, where the controller is further configured to cause the apparatus to: scramble the generated error control code before storing the scrambled error control code in the memory system.

Aspect 20: The apparatus of any of aspects 18 through 19, where the controller is further configured to cause the apparatus to: receive a second command to read the set of data from the memory system; retrieve, from the memory system, the scrambled set of data and the error control code for the scrambled set of data; perform a second error control operation on the scrambled set of data using the error control code to obtain a corrected scrambled set of data based at least in part on retrieving the scrambled set of data and the error control code; identify, based at least in part on receiving the second command, the scrambling code that was used to scramble the set of data; descramble the corrected scrambled set of data using the identified scrambling code; and transmit the descrambled corrected set of data to a host system.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving a command to write a set of data to a memory system;
selecting, based at least in part on receiving the command and a temperature of the memory system, a scrambling code from a set of scrambling codes for scrambling the set of data, each scrambling code of the set of scrambling codes corresponding to a respective temperature range of the memory system, wherein at least one scrambling code of the set of scrambling codes prioritizes storing the set of data at a voltage level over another voltage level based at least in part on the respective temperature range associated with the at least one scrambling code;
scrambling the set of data using the selected scrambling code; and
storing the scrambled set of data in the memory system.

2. The method of claim 1, further comprising:
storing, in the memory system, an indication of the selected scrambling code used to scramble the set of data.

3. The method of claim 2, wherein the indication comprises an index of a mapping that includes the set of scrambling codes, the index pointing to an entry in the mapping that includes the selected scrambling code.

4. The method of claim 2, wherein the indication comprises the selected scrambling code.

5. The method of claim 2, wherein the indication is stored in a codeword associated with the stored scrambled set of data.

6. The method of claim 1, further comprising:
receiving a second command to read the set of data from the memory system;
retrieving, from the memory system, the scrambled set of data;
identifying, based at least in part on receiving the second command, the scrambling code that was used to scramble the set of data;
descrambling the scrambled set of data using the identified scrambling code; and
transmitting the descrambled set of data to a host system.

7. The method of claim 6, further comprising:
retrieving, from the memory system, an indication of the scrambling code that was used to scramble the set of data, based at least in part on receiving the second command, wherein identifying the scrambling code is based at least in part on retrieving the indication.

8. The method of claim 1, further comprising:
generating, using an error control operation, an error control code for the scrambled set of data after the set of data has been scrambled; and
storing the error control code in the memory system.

9. The method of claim 8, further comprising:
scrambling the generated error control code before storing the scrambled error control code in the memory system.

10. The method of claim 8, further comprising:
receiving a second command to read the set of data from the memory system;
retrieving, from the memory system, the scrambled set of data and the error control code for the scrambled set of data;
performing a second error control operation on the scrambled set of data using the error control code to obtain a corrected scrambled set of data based at least in part on retrieving the scrambled set of data and the error control code;
identifying, based at least in part on receiving the second command, the scrambling code that was used to scramble the set of data;
descrambling the corrected scrambled set of data using the identified scrambling code; and
transmitting the descrambled corrected set of data to a host system.

11. The method of claim 1, wherein the scrambled set of data is stored in multi-level cells of the memory system.

12. The method of claim 1, further comprising:
identifying, based at least in part on receiving the command, the temperature of the memory system, wherein selecting the scrambling code is based at least in part on identifying the temperature.

13. An apparatus, comprising:
a controller associated with a memory system, wherein the controller is configured to cause the apparatus to:
receive a command to write a set of data to the memory system;
select, based at least in part on receiving the command and a temperature of the memory system, a scrambling code from a set of scrambling codes for scrambling the set of data, each scrambling code of the set of scrambling codes corresponding to a respective temperature range of the memory system, wherein at least one scrambling code of the set of scrambling codes prioritizes storing the set of data at a voltage level over another voltage level based at least in part on the respective temperature range associated with the at least one scrambling code;
scramble the set of data using the selected scrambling code; and
store the scrambled set of data in the memory system.

14. The apparatus of claim 13, wherein the controller is further configured to cause the apparatus to:
store, in the memory system, an indication of the selected scrambling code used to scramble the set of data.

15. The apparatus of claim 13, wherein the controller is further configured to cause the apparatus to:
receive a second command to read the set of data from the memory system;
retrieve, from the memory system, the scrambled set of data;
identify, based at least in part on receiving the second command, the scrambling code that was used to scramble the set of data;
descramble the scrambled set of data using the identified scrambling code; and
transmit the descrambled set of data to a host system.

16. The apparatus of claim 15, wherein the controller is further configured to cause the apparatus to:
retrieve, from the memory system, an indication of the scrambling code that was used to scramble the set of data, based at least in part on receiving the second command, wherein identifying the scrambling code is based at least in part on retrieving the indication.

17. The apparatus of claim 13, wherein the controller is further configured to cause the apparatus to:
generate, using an error control operation, an error control code for the scrambled set of data after the set of data has been scrambled; and
store the error control code in the memory system.

18. The apparatus of claim 17, wherein the controller is further configured to cause the apparatus to:
scramble the generated error control code before storing the scrambled error control code in the memory system.

19. The apparatus of claim 17, wherein the controller is further configured to cause the apparatus to:
receive a second command to read the set of data from the memory system;
retrieve, from the memory system, the scrambled set of data and the error control code for the scrambled set of data;
perform a second error control operation on the scrambled set of data using the error control code to obtain a corrected scrambled set of data based at least in part on retrieving the scrambled set of data and the error control code;
identify, based at least in part on receiving the second command, the scrambling code that was used to scramble the set of data;
descramble the corrected scrambled set of data using the identified scrambling code; and transmit the descrambled corrected set of data to a host system.

20. A non-transitory computer-readable medium storing code, the code comprising instructions executable by a processor to:

receive a command to write a set of data to a memory system;

select, based at least in part on receiving the command and a temperature of the memory system, a scrambling code from a set of scrambling codes for scrambling the set of data, each scrambling code of the set of scrambling codes corresponding to a respective temperature range of the memory system, wherein at least one scrambling code of the set of scrambling codes prioritizes storing the set of data at a voltage level over another voltage level based at least in part on the respective temperature range associated with the at least one scrambling code;

scramble the set of data using the selected scrambling code; and store the scrambled set of data in the memory system.

21. The non-transitory computer-readable medium of claim 20, wherein the instructions are further executable by the processor to:

receive a second command to read the set of data from the memory system;

retrieve, from the memory system, the scrambled set of data;

identify, based at least in part on receiving the second command, the scrambling code that was used to scramble the set of data;

descramble the scrambled set of data using the identified scrambling code; and transmit the descrambled set of data to a host system.

22. The non-transitory computer-readable medium of claim 21, wherein the instructions are further executable by the processor to:

retrieve, from the memory system, an indication of the scrambling code that was used to scramble the set of data, based at least in part on receiving the second command, wherein identifying the scrambling code is based at least in part on retrieving the indication.

23. The non-transitory computer-readable medium of claim 20, wherein the instructions are further executable by the processor to:

generate, using an error control operation, an error control code for the scrambled set of data after the set of data has been scrambled; and store the error control code in the memory system.

24. The non-transitory computer-readable medium of claim 23, wherein the instructions are further executable by the processor to:

scramble the generated error control code before storing the scrambled error control code in the memory system.

* * * * *